US006667715B1

(12) United States Patent
Chang et al.

(10) Patent No.: US 6,667,715 B1
(45) Date of Patent: Dec. 23, 2003

(54) SIGNAL PROCESSING CIRCUIT FOR COMMUNICATING WITH A MODULAR MOBILE SATELLITE TERMINAL AND METHOD THEREFOR

(75) Inventors: Donald C. D. Chang, Thousand Oaks, CA (US); Urban A. Von Der Embse, Westchester, CA (US); Kar W. Yung, Torrance, CA (US); John I. Novak, III, West Hills, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/376,941

(22) Filed: Aug. 18, 1999

(51) Int. Cl.$^7$ .............................. H01Q 3/22; H01Q 3/24; H01Q 3/26
(52) U.S. Cl. ........................................ 342/373
(58) Field of Search ............................. 342/373

(56) References Cited

U.S. PATENT DOCUMENTS

| 5,764,189 A | 6/1998 | Lohninger | 343/700 MS |
| 5,828,339 A | 10/1998 | Patel | 343/700 MS |
| 5,896,107 A | 4/1999 | Huynh | 343/700 MS |
| 6,002,360 A | * 12/1999 | Wolcott et al. | 342/354 |
| 6,496,146 B1 | 12/2002 | Chang et al. | |

OTHER PUBLICATIONS

Dr. Carson E. Agnew et al., "The AMSC Mobile Satellite System", Proceedings of the Mobile Satellite Conference, JPL Publication 88–9, May 3–5, 1988, pp. 3–9.
Dr. Dariush Divsalar, "Trellis Coded MPSK Modulation Techniques for MSAT–X", Proceedings of the Mobile Satellite Conference, JPL Publication 88–9, May 3–5, 1988, pp. 283–290.
U.S. patent application Ser. No. 10/272633, Chang et al., filed Oct. 17, 2002.

* cited by examiner

*Primary Examiner*—Theodore M. Blum
(74) *Attorney, Agent, or Firm*—V. D. Duraiswamy; M. W. Sales

(57) ABSTRACT

A signal processing circuit for satellite communications signal includes a first one dimensional digital beam forming circuit for forming a beam signal in a first direction and a second one dimensional digital beam forming circuit for forming a beam in a second direction. A direction filtering circuit is coupled between the first one dimensional digital beam forming circuit and the second one dimensional digital beam forming circuit. The filtering circuit determining a communications signal direction of the satellite communications signal and tunes the filter to reduce a filter bandwidth and a frequency range of said beam signal prior to processing through the second one dimensional digital beam forming circuit.

40 Claims, 8 Drawing Sheets

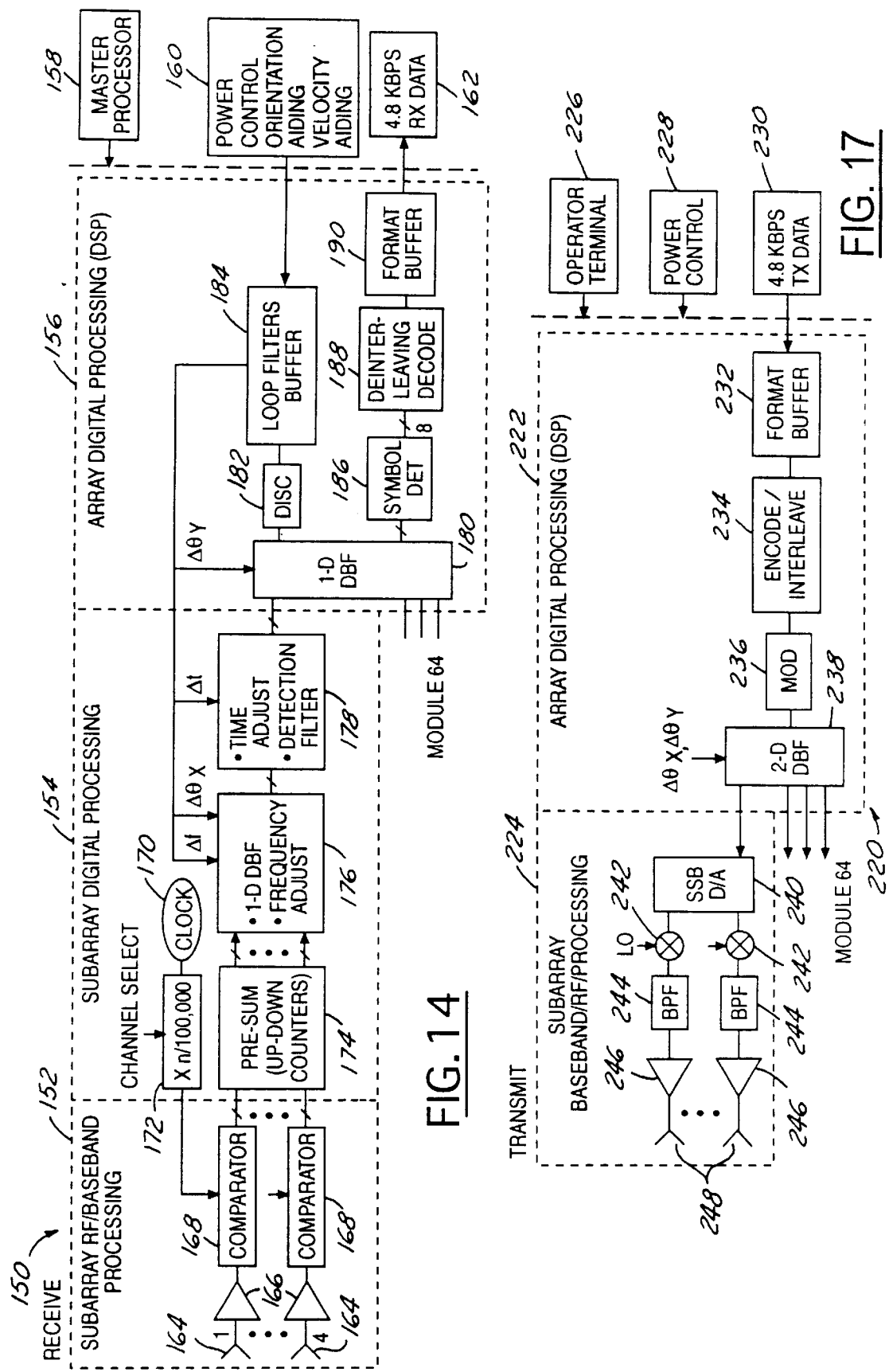

SIGNAL PROCESSING CIRCUIT FOR COMMUNICATING WITH A MODULAR MOBILE SATELLITE TERMINAL AND METHOD THEREFOR

RELATED APPLICATIONS

The present invention is related to U.S. patent application Ser. No. 09/376,942, filed on Aug. 18, 1999 entitled "Modular Mobile Terminal for Satellite Communication," which is commonly assigned and filed simultaneously herewith, and which issued as U.S. Pat. No. 6,496,146 on Dec. 17, 2002.

TECHNICAL FIELD

The present invention relates to space and communications satellites, and more particularly, to a digital signal processing circuit for transmitting and receiving satellite communications.

There is a continually increasing demand for mobile satellite communications by users on the road, on the sea, and in the air. In order to continually expand mobile satellite service to broader markets, low cost mobile systems must be employed.

Current satellite technology directed towards the consumer market typically requires a tracking ground terminal. However, the tracking antennas with this current technology are expensive and bulky and, therefore, generally unacceptable to consumers.

These current conventional tracking ground terminals, include tracking arrays with mechanisms for steering beams, such as phase shifters and/or gimbals. These tracking arrays further include integrated mechanisms for tracking the pointing directions of beams, such as monopulse tracking loops, step scan, and open loop pointing schemes. In addition, for LEO or MEO constellation it is ultimately required to have an "acquired before break" in the system. Therefore, multiple beams are required for user terminals. These conventional multibeam tracking phased arrays are too expensive for a consumer market, primarily because each beam has a separate set of electronics associated with each element to process the various signals, including many phase shifters and many duplicate strings of electronics. Therefore, the manufacturing costs for these conventional tracking phased arrays are generally beyond that practical for the consumer market whether for use as a fixed antenna or by a user as a mobile antenna.

It would therefore be desirable to reduce the complexity of the electronic circuitry associated with the mobile terminal.

SUMMARY OF THE INVENTION

It is an object of the present invention to provide a low profile mobile antenna terminal that employs signal processing circuitry that is reliable, cost effective and reduces the processing load.

In one aspect of the invention, a signal processing circuit for satellite communications signal includes a first one dimensional digital beam forming circuit for forming a beam signal in a first direction elevation and a second one dimensional digital beam forming circuit for forming a beam in a second direction. A direction (azimuth) filtering circuit is coupled between the first one dimensional digital beam forming circuit and the second one dimensional digital beam forming circuit to reduce the processing load on the second digital beam forming circuit by reducing the required processing bandwidth. The electronics circuit can form multiple beam with minimum overhead. The filtering circuit determining a communications signal direction of the satellite communications signal and tunes the filter to reduce a filter bandwidth and a frequency range of said beam signal prior to processing through the second one dimensional digital beam forming circuit.

In a further aspect of the invention, a method for signal processing a communications signals for a satellite comprises the steps of: receiving a signal from a satellite having a first frequency; reducing the bandwidth of the signal; forming first beam signal in a first direction; after the step of forming a fan beam, filtering the first beam signal to determine a beam direction signal; tuning the filter to reduce the dynamic frequency range in response to the beam direction signal; and forming spot beams in a second direction orthogonal to the first direction.

One advantage of the invention is that digital processing circuitry may be incorporated into the array to form multiple contiguous beams to allow automatic rough but cost effective direction tracking which is suitable for the mobile applications.

Other objects and features of the present invention will become apparent when viewed in light of the detailed description of the preferred embodiment when taken in conjunction with the attached drawings and appended claims.

BRIEF DESCRIPTION OF THE DRAWINGS

FIG. 14 is a functional block diagram of a receiving digital signal processing circuit.

FIG. 17 is a functional block diagram of a transmit signal processing circuit according to the present invention.

BEST MODES(S) FOR CARRYING OUT THE INVENTION

The present invention is described in accordance with an antenna terminal that is particularly suitable for mobile applications. However, one skilled in the art would recognize that the antenna terminal described is also suitable for fixed uses.

Figure 1:
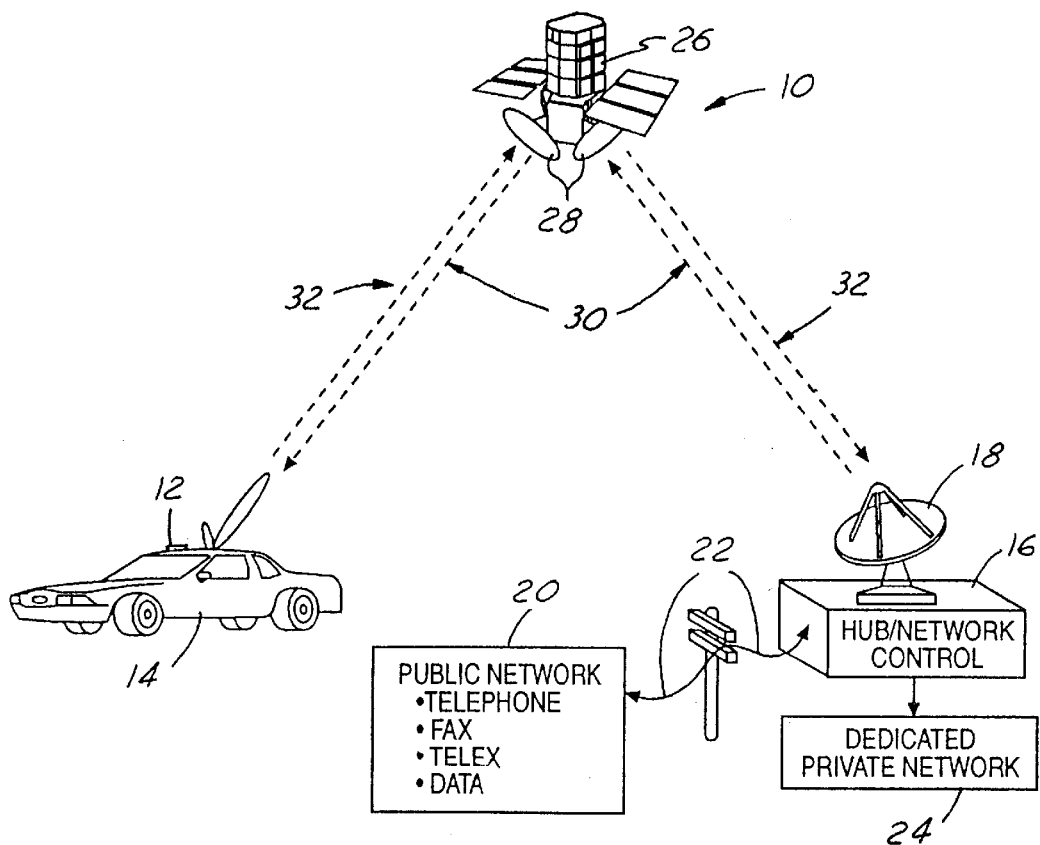
FIG. 1 is a perspective view of a communication network according to the present invention.

Referring to FIG. 1, an environmental view of the disclosed communications system in accordance with a preferred embodiment of the invention is shown. A preferred antenna 12 is positioned on an automotive vehicle 14 in a shape such as a sunroof. As shown, automotive vehicle 14 is an automobile. Automotive vehicle 14 may be any self-propelled vehicle such as a ship, airplane, train, or other automotive vehicle. The antenna size is flexible at a module of 4×1 elements. The aperture is preferably a multiple of four such as 4, 8 or 12 elements.

Communication system 10 may also include a ground terminal 16 having an antenna 18. Ground terminal 16 is in a fixed position with respect to the earth. Ground terminal 16 acts as a hub/network control. Ground terminal 16 may be coupled to public networks 20 such as telephone networks, fax networks, telex networks, or other data networks through wires 22 or through wireless communication (not shown). Ground terminal 16 may also be coupled to private dedicated networks 24. Dedicated networks 24 may, 9 for example, be a corporate intranet. Both antenna 12 and antenna 18 are RF coupled to a satellite 26. Satellite 26 may have a plurality of transmit and receive antennas 28 at Ku band and a plurality at transmit and receive at L-band. Satellite 26 may be a low earth orbit satellite (LEO) or, medium earth orbit satellite (MEO), or a geostationary earth orbit satellite (GEO).

The communications between a ground station 16, satellite 26, and user such as automotive vehicle 14 may be referred to as a forward 30, while the communications between automotive vehicle 14, satellite 26 and a ground station 16 may be referred to as a return link 32. Various frequencies may be used for communications. As an example, L-band may be used between the satellite and mobile users while Ku-band may be used between the satellite and ground station 16. A cross link may also be provided between various satellites in a network.

In the present invention, mobile users may communicate through satellite 26 through fixed ground terminal 16 which acts as a hub and network control for communicating with public networks 20 and private networks 24. Likewise, public networks 20 and private networks 24 may communicate with mobile and fixed users through satellite 26.

Figure 2:
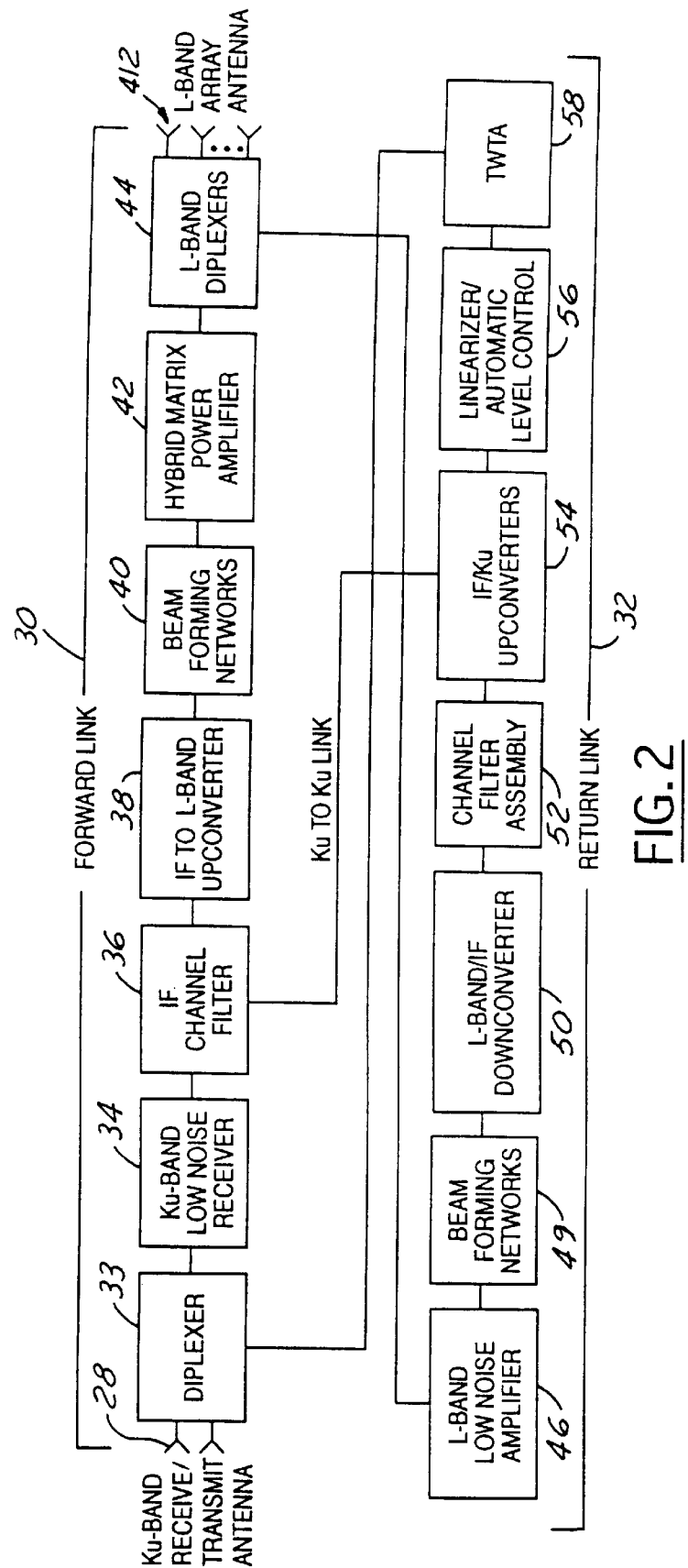
FIG. 2 is a high-level communication subsystem block diagram on-board a typical mobile communication satellite according to the present invention.

Referring now to FIG. 2, on-board satellite payload functional blocks of forward link 30 and return link 32 are shown. In forward link 30, the Ku-band transmit and receive antenna is coupled to a diplexer 33 which is coupled to a Ku-band low noise receiver 34. This antenna is linked to the fixed ground terminal. Low noise receiver 34 is coupled to an intermediate frequency channel filter 36 which is coupled to an intermediate frequency to L-band upconverter 38. An intermediate frequency is used so that the electronics may more easily process the microwave signals. Upconverter 38 is coupled to a beam forming network 40. Beam forming network 40 forms the communications beam. Beam forming network 40 is coupled to hybrid matrix power amplifier 42 which is coupled to an L-band diplexer 44. Diplexer 44 is coupled to an L-band transmit array antenna 412. Transmit array antenna 412 is linked to mobile terminals.

The L-band diplexer 44 is RF coupled to L-bank receive antenna in return link 32 through an L-band low noise amplifier 46. A beam forming network 49 is coupled to low noise amplifier 46. The signal from beam forming network 49 is coupled to an L-band intermediate frequency down converter 50. The down converted signal from down converter 50 is coupled to a channel filter assembly 52. The signal from channel filter assembly 52 is coupled to an intermediate frequency/Ku upconverter 54. Upconverter 54 is coupled to linear automatic level control 56. Linear automatic level control 56 is coupled to Ku-band traveling wave tube amplifier 58. Diplexer 33 is coupled to traveling wave tube amplifier 58. Channel filter 36 is coupled to the upconverter 54 in a Ku-band to Ku-band link. Low noise amplifier 46 is coupled to diplexer 44. Diplexer 33 is coupled to Ku-band traveling wave tube amplifier 58.

The satellite system preferably uses a priority demand assignment multiple access system which controls access to the network. This type of system monitors usage of channels to the users. The system coordinates assignment of channels in all beams on each satellite on a dynamic basis to determine interbeam and intersystem interference. Channel assignments between mobile user terminals and ground stations may be switched similar to the way in which cellular telephone channels are dynamically allocated. When a mobile user originates a call to a fixed user, the mobile terminal 12 generates a call request to the satellite system on an L/Ku-band signaling circuit (return link). The system sets up the call using a Ku-band common signaling circuit to the hub station that serves the calling party. When the calling party answers, the system may set up a duplex L/Ku-band circuit between mobile user terminal 12 and the ground or hub station 16 via satellite 26. The system monitors the call during the duration on a common signaling circuit using the Ku-band link with the hub station. When a call originates through a hub station to a mobile user, a similar sequence occurs. Ground terminal 16 communicates the call request to the system on a Ku/L-packet circuit. When a mobile user terminal acknowledges, the system assigns a duplex L/Ku-band circuit to the call.

Figure 3:
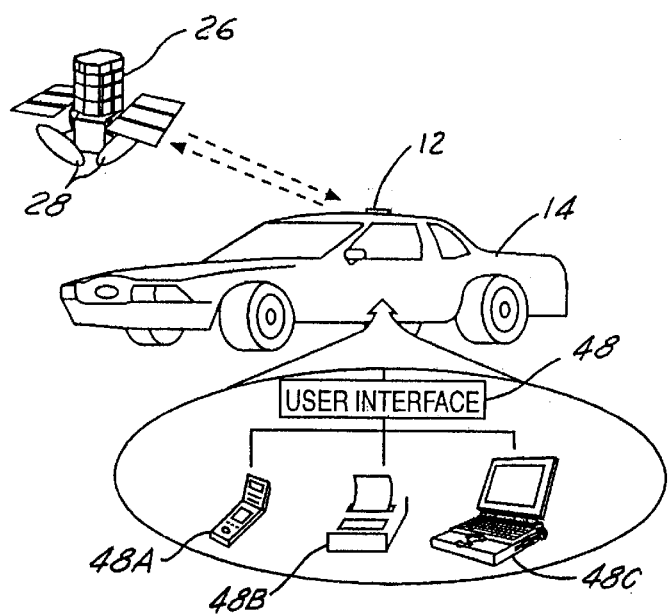
FIG. 3 is a perspective view of an automotive vehicle having a mobile terminal according to the present invention.

Referring now to FIG. 3, an automotive vehicle 12 is shown having a mobile terminal interface 48 which may comprise cellular phone 48A, a fax machine 48B, or a lap top computer 48C. User terminals 48 are coupled to antenna terminal 12. Mobile terminal 12 couples signals to satellite 26 via L-band linkage.

Figure 4:
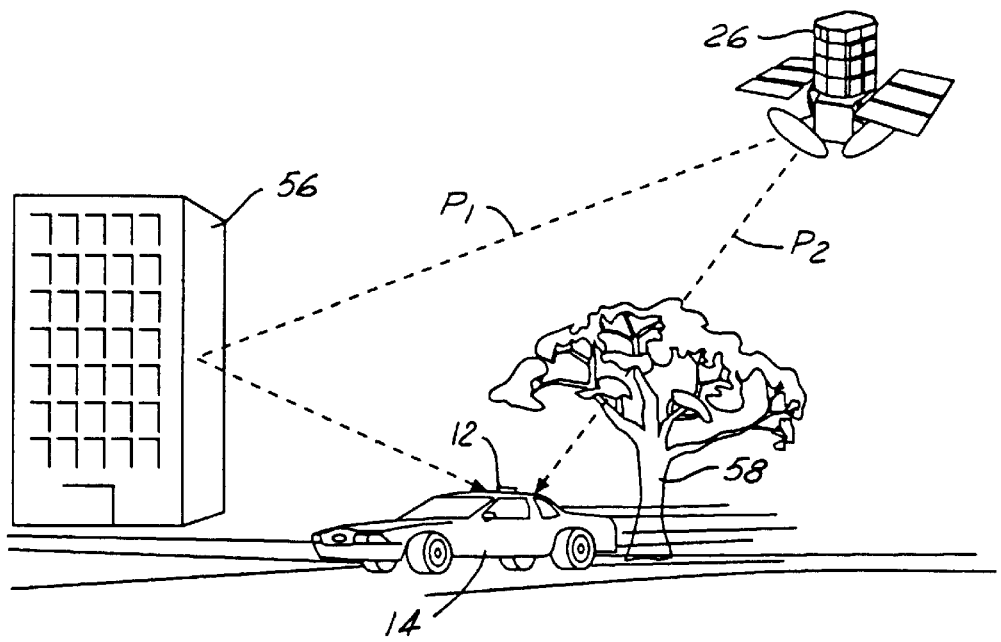
FIG. 4 is a perspective view of an automotive vehicle and satellite illustrating multi-path and fading distortions.

Referring now to FIG. 4, as will be further described below, the digital signal processing contained within mobile terminal 12 is suitable to compensate for multipath distortion as represented by path Pl representing a signal from satellite 26 reflecting from a building 56.

Also, the digital signal processing contained within mobile terminal 12 may be used to compensate for fading as represented by path $P_2$ through a tree 58.

Of course, other sources of fading and multipath distortion may be encountered in operation of antenna terminal 12. Also, the digital signal processing may also mitigate any distortion due to motion of automotive vehicle 14.

Figure 5:
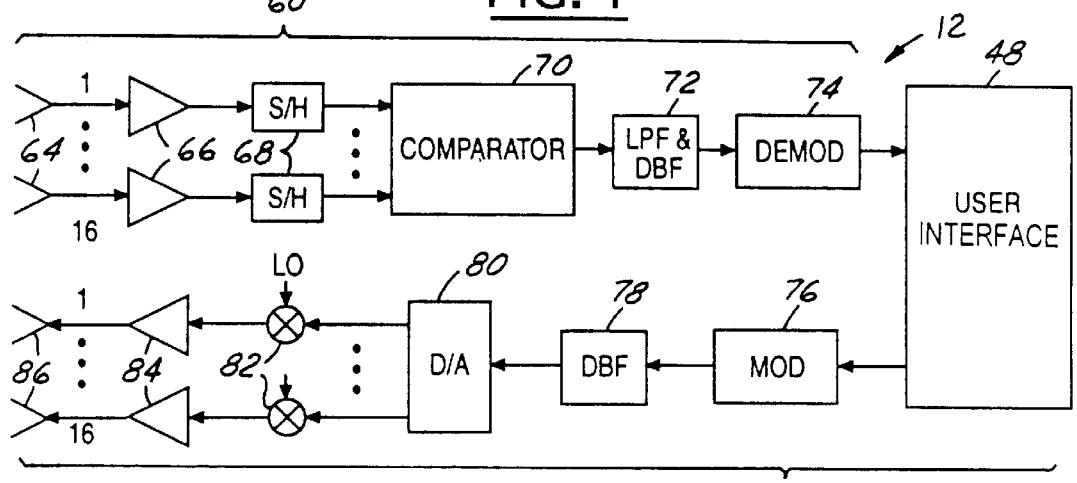
FIG. 5 is a block diagram of a satellite terminal according to the present invention.

Referring now to FIG. 5, a functional block diagram of mobile terminal 12 is shown. Mobile terminal 12 has a receive circuit 60 and a transmit circuit 62. For both transmit circuit 62 and receive circuit 60, digital beam forming is implemented at baseband. Multiple beams are found in a single beam transmit. As will be further described below, the digital beam forming, filtering and tracking functions may be interleaved to optimize digital loading.

Receive circuit 60 generally has a plurality of receiving elements 64 which form the beam. Receiving elements 64 are coupled to an amplifier 66 that amplifies the analog signal. At element level, broad bandwidth but with limited (aggregate) signal dynamic range will be accommodated. Therefore, high speed but low bit count sampling (A/D) will be used. A sample and hold circuit 68 is coupled to amplifier 66 and receives the L-band signal. By directly sampling through sample and hold circuit 68, a down-converter may be eliminated. Sample and hold circuit 68 performs an analog-to-digital conversion function. Sample and hold circuit 68 is coupled to comparator 70. Comparator 70 is coupled to low pass filter/digital beam forming circuit 72. Low pass filter/digital beam forming circuit 72 is coupled to demodulator 74. In the receive circuit 60, the received signal is amplified, band pass filtered and digitized. High speed/low resolution analog to digital conversion is preferred in the design to minimize the cost. For example, a one-bit A/D with 28 Msps may be used. The comparator 70 (A/D) samples at more than 200 Msps and reduces the signal bandwidth to 48 kHz before digital beam forming. The digital beam forming combines the signals from each of elements 64 to form the beam pointed in the selected direction. The one-dimensional send beams have reduced the field of view to a smaller beam width than that of an individual element. The filtering will reduce the bandwidth where the intended signal occupies. As a result of the spatial/temporal processing, the field of view and bandwidth will be reduced while its dynamic range will be enlarged. Demodulator 74 is coupled to the user terminal 48, which may include telephone, faxes or computers.

In transmit circuit 62, user terminal 48 is coupled to a modulator 76. Modulator 76 modulates the signal from user terminal 48. Modulator 76 is coupled to digital beam forming circuit 78. Digital beam forming circuit 78 is coupled to a digital-to-analog converter 80. Digital-to-analog converter 80 is coupled to a plurality of up-converters that up-converts the signal in preparation for RF transmission. A local oscillator is coupled to the up-converters and the up-convertered signals will be amplified in amplifiers 84 which in turn are coupled to transmit elements 86. In the transmit circuit 62, signals from user interface 48 are digitally modulated and multiplied by directional coefficients separated for various elements in the beamformer. The digital beam former in the transmit channels are responsible for the signal coherent addition in the far field. The processed digital signals are D to A converted, up-converted, band pass filtered, amplified, and radiated by transmit elements 86. The radiated power from transmit elements 86 will be combined coherently in the far field in the selected direction.

Figure 6:
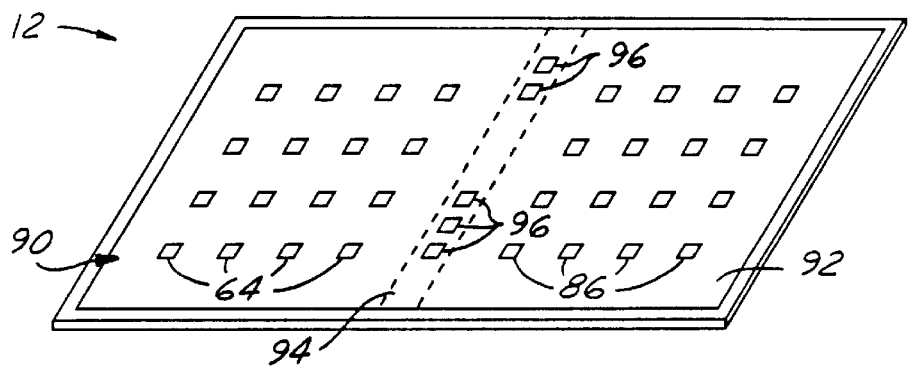
FIG. 6 is a perspective view of a terminal formed according to the present invention.

Referring now to FIG. 6, a perspective view of the physical layout of a mobile terminal 12 is illustrated. Mobile terminal 12 provides a low cost, low profile configuration that also provides high performance. As shown, antenna terminal 12 has a receive portion 90, a transmit portion 92, and a digital signal processing portion 94. It should be understood that the illustrated antenna configuration is merely a preferred embodiment for achieving the objects of the present invention and that other configurations that provide low cost, low profile and high performance may be utilized.

Receive portion 90 and transmit portion 92 have a plurality of elements for transmitting and receiving signals. Receive portion 90 has a plurality of receive elements 64 and transmit portion has a plurality of transmit elements 86. Preferably, transmit elements 86 and receive elements 64 are configured the same as will be further described below. Digital signal processing portion 94 has a plurality of digital signal processing chips 96 that are coupled to receive elements 64 and transmit elements 86 to perform the functions as described above in conjunction with FIG. 5 and further described below.

As illustrated, receive array 90 and transmit array 92 have 16 elements each. The elements are arranged in four rows and four columns of four elements. The layout and number of elements are a design choice that may be determined with respect to its application. The array preferably has at least four elements in a row or column. As will be further described below, at least four elements allows faster signal processing. It is preferable to have the number of elements be multiples of four. In one constructed embodiment, antenna terminal 12 was 85 centimeters by 40 centimeters and having a thickness of less than one centimeter. Receive array 90 is 40 centimeters by 40 centimeters and transmitter array is 40 centimeters by 40 centimeters. Each receive element 64 and transmit element 86 are five centimeters by five centimeters. Individual radiating elements are dielectrically loaded to have nearby flat gain over the field of view of interest. At L-band, the element spacing is about 2 wavelengths. Therefore, the grating lobes will appear at +300 at both X and Y direction when the main beam is at 0°. At the diagonal plane, the grating lobes will appear at ±45° from the bore sight. Grating lobes will be used for connectivity. The size of the transmit elements 86 and receive elements 64 are determined by the receive and transmit frequencies. Preferably, the separate transmit and receive antennas provide a minimum of 10 dBI antenna gain over a ±70° field of view.

One advantage of the small thickness of mobile terminal 12 is that the antenna terminal may be conformably mounted on the top of a roof, as the shape of a sunroof or trunk of an automotive vehicle or other structure in an airplane, ship or train.

Figure 7:
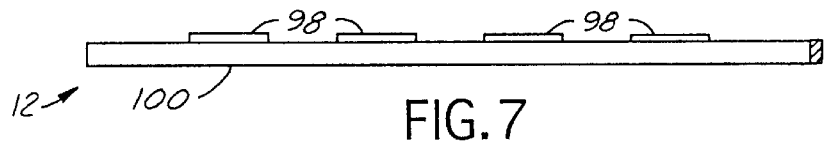
FIG. 7 is a side view of a transmit or receive array of the present invention.

Referring now to FIG. 7, a mobile terminal 12 is shown fully assembled. Radiating elements 64 may each have a parasitic patch 98 coupled to the outside of a layer assembly 100. Each parasitic patch 98 is coupled to layer assembly 100 as a part of a receive element 64 or a transmit element 86. Parasitic patch 98 are an optional feature that are used for bandwidth control. By using a parasitic patch 98, bandwidth of transmit 86 and receive elements 64 may be broadened.

Figure 8:
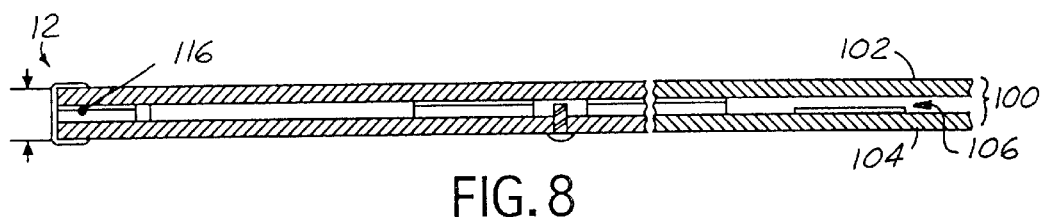
FIG. 8 is a cross-sectional view of an array terminal according to the present invention.
Figure 9:
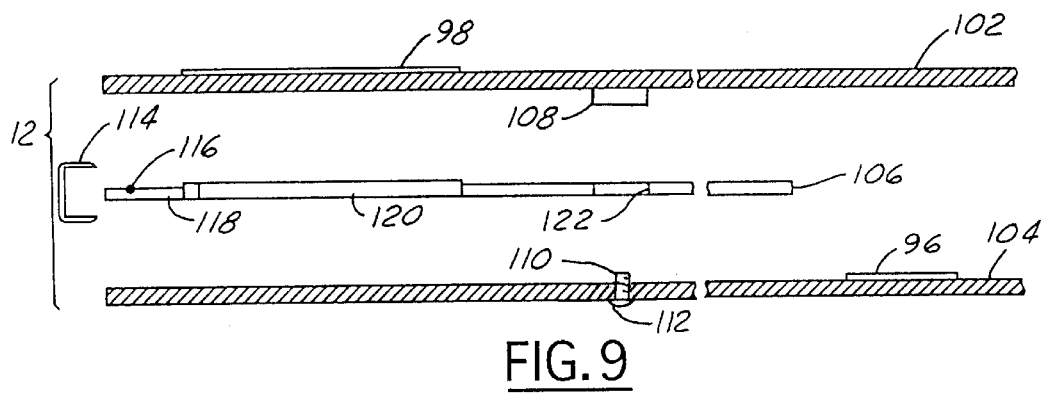
FIG. 9 is an exploded view of the array terminal of FIG. 8.

Referring now to FIGS. 8 and 9, layer assembly 100 generally has a radome layer 102, a support layer 104, and a module layer 106 positioned between radome layer 102 and support layer 104. If mobile terminal 12 is to be used in a harsh environment, radome layer 102, support layer 104, and module layer 106 may be hermetically sealed together to protect all modules housed in module layer 106.

Radome layer 102 may be formed from a dielectric material such as glass or plastic. Radome layer 102 is used for protection of module layer 106 and to carry parasitic patch 98. Radome layer 102 may also have a post 108 fixedly coupled thereto. As will be further described below, post 108 may provide a means for coupling layer assembly 100 together.

Support layer 104 is also preferably formed of a dielectric material such as plastic or glass. Support layer 104 may have a fastener opening 110 for receiving a fastener 112. Fastener 112 may be used to couple to post 108 on radome layer 102. Of course, several fasteners 112, fastener openings 110, and posts 108 are likely to be incorporated in a commercial embodiment. Support layer 104 is used to house digital signal processing chips 96 which perform digital beam forming and frequency filtering functions.

An edge cap 114 may be coupled around the peripheral edge of antenna terminal 12. Edge cap 114 preferably extends over radome layer 102 and support layer 104. Edge cap 114 provides protection to the module layer from the environment.

Module layer 106 generally comprises a spacer 118 and a plurality of element modules 120. Spacer 118 is also preferably formed from a dielectric material such as plastic or glass. Module layer 106 may also have a hole 122 therethrough for receiving post 108 and fastener 112.

Figure 10:
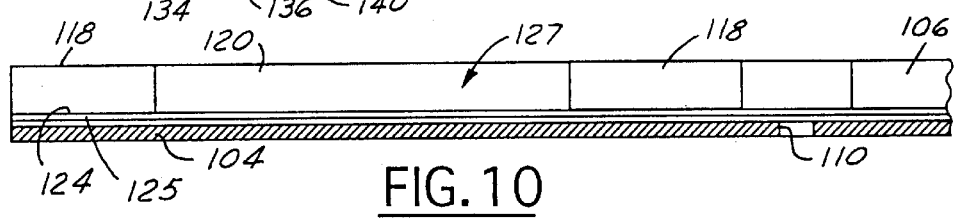
FIG. 10 is a cross-sectional view of a portion of an array back plate.

Referring now to FIG. 10, as assembled support layer 104 and module layer 106 are illustrated. Support layer 104 may also be used to support a logic network 124. Logic network, for example, may be a Kapton film with interconnecting circuit traces 125 printed thereon. Logic network 124 may be manufactured separately and adhesively bonded to support layer 104. In a commercial assembly, support layer 104, logic network 124, and spacer 118 may be coupled together so that a plurality of logic module openings 127 are formed. This will allow element modules 120 to be easily assembled therein in the proper location.

Figure 11:
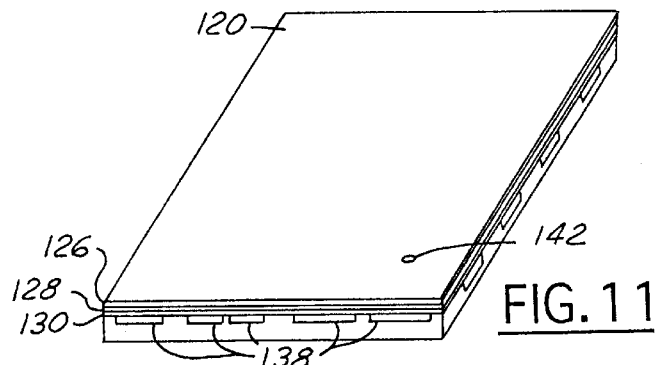
FIG. 11 is a perspective view of an element module according to the present invention.
Figure 12:
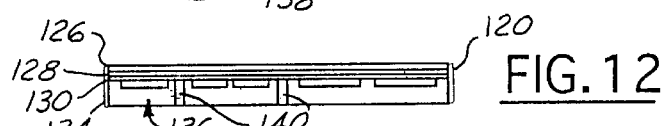
FIG. 12 is a cross-sectional view of the element module of FIG. 11.

Referring now to FIGS. 11 and 12, an element module 120 is shown. Functionally, element modules will convert microwave energy into digital streams in a receive mode, and vice versa in transmit mode. Structurally, element modules function as light bulbs in optical illumination providing more antenna gain with more modules in the array. Coherent addition functions are provided, not at the element level, but at the "backplate" in digital format.

Element module 120 has a radiating patch 126 which is coupled onto a dielectric layer 128. Dielectric layer 128 is coupled to a ground plane 130. Ground plane 130 is preferably sized about the same or slightly larger than radiating patch 126. Radiating patch 126, dielectric layer 128, and ground plane 130 generally form a microstrip antenna. Dielectric layer 128 generally is coupled to a housing 134. Housing 134 extends from dielectric layer 128 to form a cavity 136 therein. Element module circuit chips 138 are coupled to ground plane 130 within cavity 136.

A plurality of interconnections 140 may be used to couple element circuit chips 138 to the appropriate circuit traces on multilayer logic network 124. Interconnections 140 may, for example, be a spring connector or other suitable connection. The connections may be hardwired but if the module is to be easily disassembled, then spring connectors may be preferred. Both logic connections and power and ground connections may be made through interconnections 140.

A feed 142 may be formed in radiating patch 126. Feed 142 is an opening in radiating patch 126. Feed 142 is used to interconnect RF signals from an amplifier to patch 126.

The present invention is designed to minimize the amount of microwave and RF circuitry by converting incoming signals to digital signals as early as possible in the receive circuitry chain. Digital beam forming is employed to electronically steer the beam at base band. As will be further described below, the processing functions such as digital beam forming, filtering, and tracking are interleaved in performance to minimize digital loading.

Figure 13A:
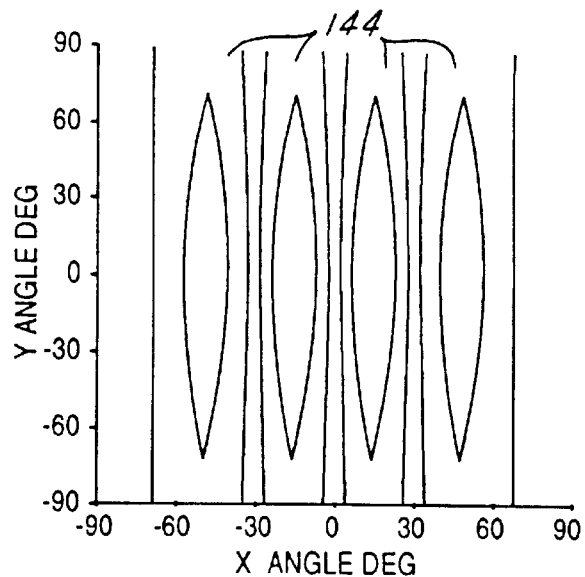
FIG. 13A is a simulated beam pattern formed in a single dimension in a two dimensional array.
Figure 13B:
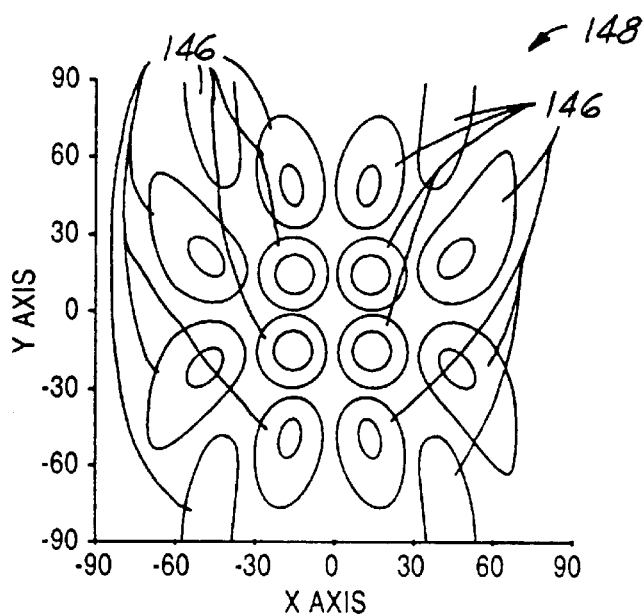
FIG. 13B is a simulated beam pattern from an array according to the present invention.

Referring now to FIGS. 13A and 13B, a beam pattern generated by receive array 90 or transmit array 92 is illustrated. Digital beam forming is essentially accomplished in two steps. First, a fan beam is formed by each four element linear subarray that essentially forms four columns 144 parallel to the elevation direction in the far field as shown in FIG. 13A. The four fan beams are orthogonal beams. Fan beams may be formed with the same orientation by linear combinations of the four orthogonal beams. Four sets of overlapped fan beams from the four subarrays are present. One or two fan beams are selected for further processing. In an orthogonal direction to the elevation direction, an additional beam forming operation is performed that coherently sums the outputs of all the subarrays. As shown in FIG. 13B, this forms spot beams 146 which in turn forms a beam footprint 148. The output of the first one-dimensional digital beam forming will be filtered to reduce the bandwidth from 48 Kbps. to 4.8 KHz and hence increase its dynamic range accommodating by 1–5 bits (10 dB). As a result, the processing load of the second one-dimensional DBF will be significantly reduced.

Referring now to FIG. 14, a receive digital signal processing circuit 150 is illustrated in block diagram form. Receive digital processing circuit 150 has a subarray RF/base band processing circuit 152, a subarray digital processing portion 154 and an array digital processing portion 156. Various modulation techniques may be employed by a receive circuit. For example, trellis code decoding, quadrature amplitude modulation, as well as, the constant-envelope QPSK demodulators used for mobile satellite communications may be employed.

The receive digital signal processing circuit 150 may be coupled to a local master processor 158 to do a power control, orientation aiding and velocity aiding circuit (aiding circuit) 160, and a data receiving port 162 for receiving formatted data from array digital processing circuit 156. The local master processor may derive this information from storage data and broadcast signals from the master hub.

Subarray RF/baseband processing circuit 152 has a plurality of receiving elements 164 which are coupled to an amplifier 166. Each amplifier 166 is then coupled to a comparator 168 which performs analog-to-digital conversion. Of course, other suitable devices for analog to digital conversion such as a one bit or multiple bit analog-to-digital converter may be used.

In rough frequency control, subarray digital processing circuit 154 has a clock 170 coupled to a channel selector 172. Clock in combination with channel selector 172 are coupled to comparator 168 for controlling the sampling frequency and thus the rate of analog-to-digital conversion of comparator 168. Subarray digital processing circuit 154 also includes a presummer 174 which is coupled to comparators 168. Presummers 174 are coupled to a one-dimensional digital beam forming circuit 176. One-dimensional digital beam forming circuit is coupled to a time adjustment and direction detection filter 178. As will be further described below, subarray digital processing circuit 154 is used to form columnar beams such as that shown in FIG. 13A. The timing mechanism provides the mechanism for rough tuning for 48 KHz filtering. The beam forming reduces the field of view of the potential directions of the signal arrival.

Array digital processing circuit 156 has a second one-dimensional digital beam forming circuit 180 that is used to form the spot beams illustrated in FIG. 13B. Before the second beam forming the process signal bandwidth has reduced significantly from 14 MHz to 4.8 KHz. Similarly, the field of view has reduced from hemispheric to a quarter of the field of view. Multiple beam forming in the second digital beam former will cost hardly any overhead. The second one-dimensional digital beam forming circuit 180 is coupled to time adjuster/detection filter 178. One-dimensional digital beam forming circuit 180, as will be further described below, forms the beam in the direction orthogonal to the beam direction of one-dimensional digital beam forming circuit 176.

In the diagnosis signal path, array digital signal processing circuit 156 has a discriminator 182 coupled to one-dimensional digital beam forming circuit 180. Discriminator 182 is coupled to a loop filter and buffer circuit 184. Loop filter and buffer circuit 184 may be coupled to circuit 160 to control timing, frequency and angle offset.

In the main signal path, one-dimensional digital beam forming circuit 180 may also be coupled to a symbol detector 186. Symbol detector 186 is coupled to a deinterleaving and decoding circuit 188. Deinterleaving and decoding circuit 188 is coupled to a format buffer 190. Format buffer 190 formats the information received so that local master processor or other device may easily use the information.

Figure 15:
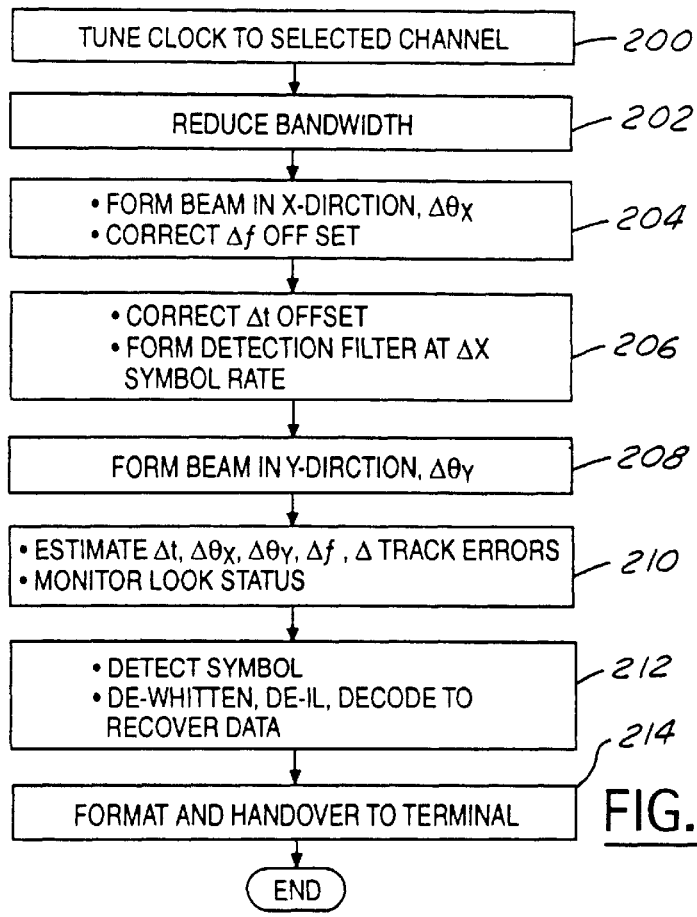
FIG. 15 is a flow chart of the receiving signal processing circuit of FIG. 14.

Referring now to FIGS. 15 and 16 (a through d), in conjunction with FIG. 14, the operation of receive circuit 150 is described. Each receive element 164 receives the RF signal. In the present example in FIG. 16A, the center frequency $f_0$ of the received signal is equal to 1549.5 Megahertz. The approximate channel frequency is then estimated. Comparators 168 reduce the signal to a 14 MHz signal. In step 202, the bandwidth is reduced further by presummer 174. Presummer 174 acts as an up-down counter to reduce the 14 MHz band generated by the converter to a 48 KHz bandwidth spectrum at base band. This is generally represented in FIG. 16B. As a result of the integration by presummer 174, each sample has 6 to 7 bits of resolution (dynamic range). As shown in FIG. 16B, the center frequency may be offset from center frequency $f_k$. The sampling rate is adjusted by slewing the clock 170 to a submultiple of the RF frequency of the selected channel, so that consecutive comparator samples are offset by 90°. This removes the RF frequency and centers the spectrum at D.C. FIG. 16B represents the formation of beam 192. In this example, it is assumed that the first set of beams, the columnar fan beams as shown in FIG. 13A, are presumed to be formed in the X direction.

Figure 16A:
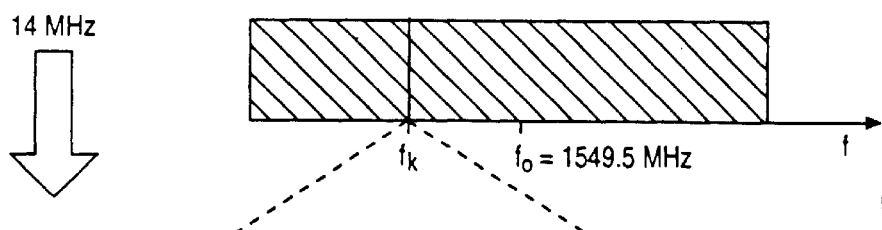
FIGS. 16A–D are signals processed according to the flow chart of FIG. 15.
Figure 16B:
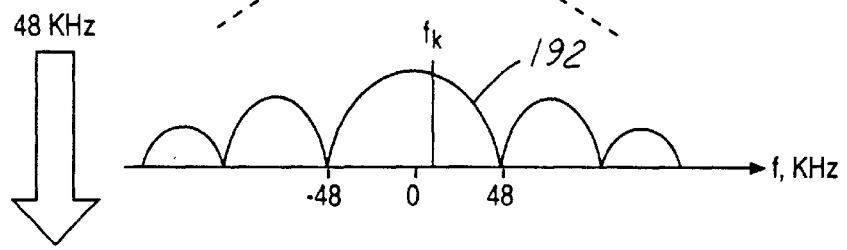
Figure 16C:
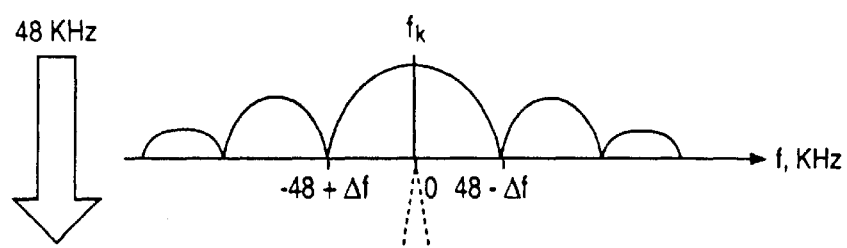
Figure 16D:
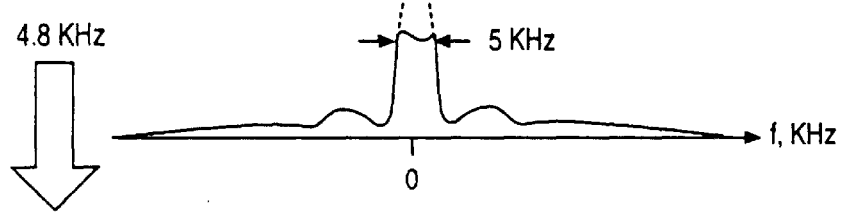

In step 204, a columnar beam signal is formed in the X direction by one-dimensional digital beam forming circuit 176. As shown in FIG. 16C and as will be further described below, a correction factor $\Delta\theta_x$ and a frequency correction $\Delta f$ may be taken into consideration so that the 48 KHz signal is centered within a "DPF" and "selected fan beam." Preferably, one-dimensional digital beam forming circuit 176 uses a fast Fourier transform to perform one dimensional digital beam forming. Because four sets of elements are used, each consecutive sample may be offset by 90°. This eliminates cosine and sine multiplications in the processing. This significantly reduces the processing burden in the digital beam forming process. In step 206, time adjuster/detection filter 178 are used to correct small changes in timing $\Delta t$. Detection filter performs a finite impulse response and decimation filtering on the 48 KHz signal to yield a 4.8 Ksps subarray output. As shown in FIG. 16D, preferably the signal has a bandwidth of five KHz.

The columnar beam signals from various subarrays are weighed separately to form beams in the orthogonal direction. One-dimensional digital beam forming circuit 180 is used to form a beam pattern such as that shown in FIG. 13B from the columnar beam signal such as that shown in FIG. 13A. One-dimensional digital beam forming circuit 180 receives the 4.8 Ksps signal which is combined coherently by phase adjustment and summation in the Y-direction to form the spot beams. Tracking is implemented by forming a separate tracking null in both the elevation and azimuth directions, which imposes only a minor additional processing load. After the completion of the digital beam forming at the array level, the signal is demodulated and acquisition, synchronization and tracking functions are performed.

In step 210, line adjustment of digital beam forming is performed in the Y direction using timing errors $\Delta t$, phase errors $\Delta\theta y$, frequency errors $\Delta f$ and $\Delta$ tracking errors.

In step 212, the transmission symbols or characters are detected by symbol detector 186. Each symbol, for example, may be delineated by a start and stop bit.

Deinterleaving and decoding circuit 188 demodulates the signal using the appropriate demodulation technique. Demodulation may consist of several operations: Signal synchronization, quadrature demodulation, matched filtering, deinterleaving, trellis decoding and unscrambling, each of which are known in the art. Signal synchronization is accomplished by a tracking loop with feedback ($\Delta t$) to the subarray detection filter 178. This allows the timing to be adjusted in track to within $\frac{1}{20}^{th}$ of a symbol to minimize losses due to timing jitter. Quadrature demodulation multiplies the incoming data stream by a sine and a cosine term to convert the data stream into two orthogonal data streams (in-phase, quadrature). The orthogonal data streams are then match-filtered to remove the raised cosine pulse shape applied in transmitter. The interleaving effectively unshuffles the incoming signals. During transmission of the received signal, the signals were interleaved to improve tolerance to fading. The interleaving rearranges the symbols in their original order so that they may be properly decoded by the trellis decoder.

The trellis decoder may, for example, employ a Viterbi decoder to perform error correction and symbol identification. The Viterbi decoder selects the most likely symbol sequence based on a series of tentative symbol decisions. After a number of symbols have been evaluated, the decoder generates the most likely first symbol, and continues. Thus, a small delay in processing is introduced by the circuitry.

The unscrambling process multiplies the data input stream by a polynomial to effectively reverse the randomization of the data stream performed by the transmitter. The polynomial selected to compliment the polynomial used by the transmitter.

One-dimensional digital beam forming circuit 180 is coupled to a discriminator 182 and loop filters/buffer 184. Discriminator 182, loop filters and buffer 184 perform the acquisition/synchronization and tracking functions. The main processor of the terminal may be used to provide velocity information regarding the vehicle to loop filter/buffer 184. Also, the main processor of the terminal may provide orientation aiding or power control to loop filter/buffer 184. The use of velocity and orientation information allows the use of large tracking/loop time constants (small loop bandwidth) to minimize jitter and reduce the effects of fading during vehicle operation. The processing rate of loop filter/buffer 184 is chosen as a compromise between processing load and bandwidth requirements. As described above, a 48 Ksps processing rate was chosen. The frequency-tracking loop employs a frequency lock loop to control the phase rotation of the subarray detection filters.

The time correction loop is responsible for symbol synchronization. Computes data and discriminates and adjusts the sample time of the subarray detection filters. The loop controls timing to within plus or minus 1/20 of the symbol.

The beam tracking loop computes a beam tracking null in two orthogonal directions, and adjusts digital beam forming coefficients for both transmit and receive. It preferably performs these computations at intervals rather than continuously to reduce the processing load.

Referring now to FIG. 17, a transmit digital signal processing circuit 220 is illustrated having a transmit array digital processing circuit 222 and a subarray base band/RF processing circuit 224. Transmit signal processing circuit 220 may be coupled to a main processor of the terminal 226 which may provide information such as power control 228 to array digital processing circuit 222. Data is provided to transmit array digital processing circuit 222 by a data transmitting port 230. Data transmitting port 230 preferably provides information to transmitter array digital processing circuit 222 at 4.8 Ksps. Transmit array digital processing circuit 222 has a format buffer 232, an encoder and interleave circuit 234, a modulator 236 and a two dimensional digital beam forming circuit 238.

Subarray base band/RF processing circuit 224 has a single side band digital-to-analog converter 240 coupled to two-dimensional digital beam forming circuit 238. Single side band digital-to-analog converter 240 is coupled to each transmit element 248 through a local oscillator/mixer 242 which is coupled to a band pass filter 244 and an amplifier 246. Amplifier 246 is coupled to transmit element 248.

Format buffer 232 formats the signal to be transmitted in an opposite manner to that described above with respect to receive signal processing circuit 150. The formatted signal from format buffer 232 is encoded and interleaved in encoder/interleave circuit 234. Encoder/interleave circuit 234 encodes the signal in preparation for transmission. Modulator 236 may, of course, include circuitry to perform the various types of modulation as described above. Modulation may consist of several operations: Scrambling trellis encoding to improve noise performance, interleaving, mapping of the trellis/encoded bit stream to two orthogonal (in-phase and quadrature) components, raised cosine pulse shaping, and quadrature modulation. Encoder/interleave circuit 234 may also scramble the signal by generating a polynomial to generate a pseudo random sequence. Also modifications may be made to the signal to flatten the transmit spectrum to use the full channel bandwidth.

Interleaving of the data stream minimizes the length of burst errors caused by fading. Interleaving effectively breaks up burst errors due to long-duration fading into distributed single-symbol errors. This is particularly important for voice transmission applications. The interleave data are then encoded into in-phase and quadrature values with the values selected to achieve maximum code distance. These values are then filtered with a raised cosine pulse-shaping filter and digital quadrature modulator.

Two-dimensional beam forming circuit 238 may be coupled to the receiving circuit to identify the designated signal direction including receive phase angle corrections $\Delta\theta_x$ and $\Delta\theta_y$ in the X and Y direction, respectively.

Figure 18:
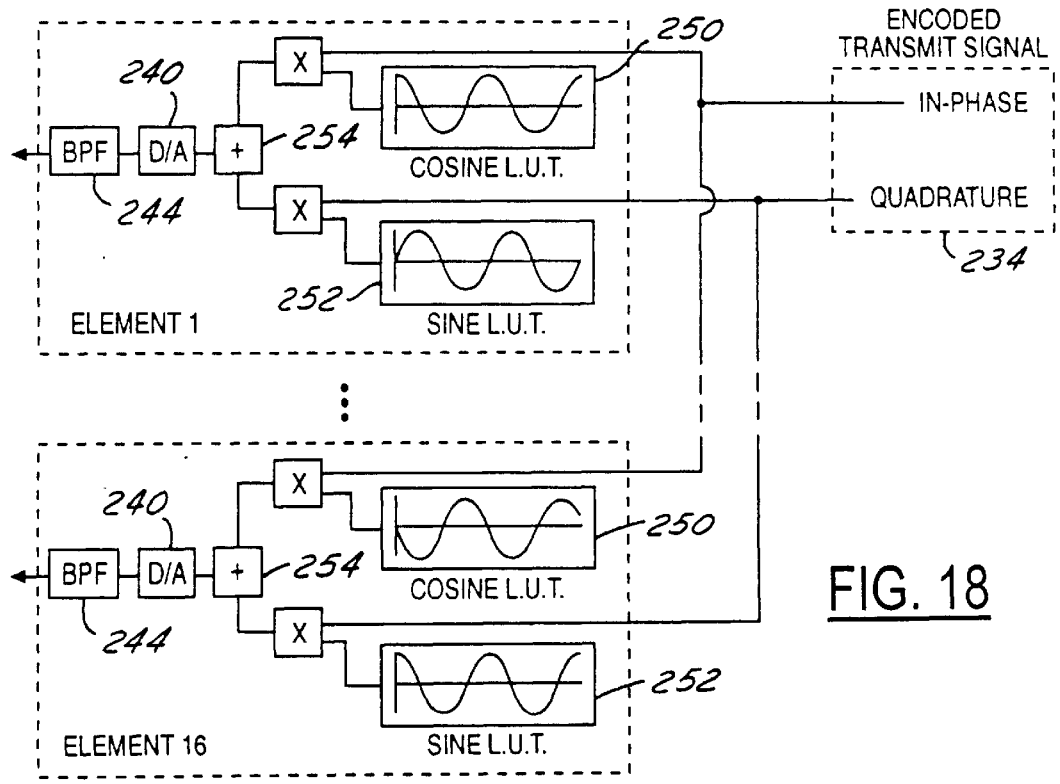
FIG. 18 is a block diagram of an encoding and beam forming circuit according to the present invention.

Referring now also to FIG. 18, encoder/interleave circuit 234 is shown coupled to each element. Each element has a cosine lookup table 250 and a sine lookup table 252. The cosine lookup table 250 and sine lookup table 252 are used to offset each transmit element to represent a phase shift. The up converted in-phase and quadrature values are then summed together in summer 254. Thus, only a single digital-to-analog converter 240 and a relatively inexpensive band pass filter are required to complete the modulation process. The output of band pass filter 244 is coupled to each transmit element 248.

Figure 19:
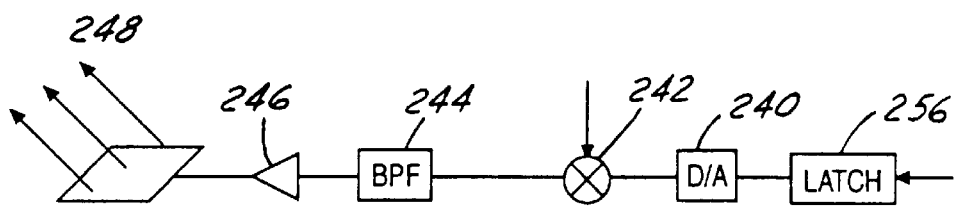
FIG. 19 is a transmit element circuit according to the present invention.

Referring now to FIGS. 18 and 19, each of the transmit elements of the transmit array may contain a latch 256, digital-to-analog converter 240, local oscillator/mixer 242, beam band pass filter 244, amplifier 246, and transmitting element 248. Amplifier 248 246 may be a solid state power amplifier. The components of FIG. 19 may be implemented in the signal processing portion of the mobile terminal shown in FIGS. 6–12.

While particular embodiments of the invention have been shown and described, numerous variations and alternate embodiments will occur to those skilled in the art. Accordingly, it is intended that the invention be limited only in terms of the appended claims.

What is claimed is:

1. A signal processing circuit for a satellite communications signal comprising:
    a first one dimensional digital beam forming circuit for forming a beam signal in a first direction;
    a second one dimensional digital beam forming circuit for forming a beam in a second direction; and
    a filtering circuit coupled between said first one dimensional digital beam forming circuit and said second one dimensional digital beam forming circuit, said filtering circuit roughly determining a communications signal direction and a frequency bandwidth of the satellite communications signal so that said filtering circuit reduces a filter frequency bandwidth and a range of potential arrivals of said signal prior to said second one dimensional digital beam forming circuit.

2. A signal processing circuit as recited in claim 1 wherein said first direction is orthogonal to said second direction.

3. A signal processing circuit as recited in claim 1 further comprising a loop filter detection circuit for generating a first direction error signal, a second direction error signal, a timing error signal and a frequency error signal.

4. A signal processing circuit as recited in claim 3 further comprising a transmit circuit having a two dimensional digital beam forming circuit, said two dimensional digital beam forming circuit receiving said first direction error signal and said second direction error signal.

5. A signal processing circuit as recited in claim 1 further comprising a symbol detector and decoder circuit coupled to said second one dimensional digital beam forming circuit.

6. A signal processing circuit as recited in claim 5 further comprising a formatting circuit coupled to said decoder circuit for generating a formatted signal.

7. A signal processing circuit for satellite communications comprising:
    a receive signal processing circuit having;
        a baseband processing circuit receiving an RF signal and converting the RF signal to a digital signal;
        subarray processing circuit digitally beam forming a receiving beam in a first direction;
        said subarray processing circuit having a detection filter for determining a direction of the beam, said detection filter forming a modified beam in response to first direction; and
        an array digital processing circuit coupled to said subarray processing circuit for forming said beam in a second direction.

8. A signal processing circuit as recited in claim 7 wherein said first direction is orthogonal to said second direction.

9. A signal processing circuit as recited in claim 7 further comprising a transmit signal processing circuit having a subarray circuit and an array digital processing circuit.

10. A signal processing circuit as recited in claim 9, said array digital processing circuit having a two dimensional beam forming circuit.

11. A signal processing circuit as recited in claim 10 wherein said array digital processing circuit comprises a format circuit, and modulator coupled to said two dimensional beam forming circuit.

12. A signal processing circuit as recited in claim 11 wherein said subarray circuit comprises a digital to analog converter coupled to said two dimensional beam forming circuit.

13. A signal processing circuit as recited in claim 12 further comprising a loop filter detection circuit for generating a first direction error signal, a second direction error signal, a timing error signal and a frequency offset error signal.

14. A signal processing circuit as recited in claim 13, said two dimensional beam forming circuit receiving said first direction error signal and said second direction error signal.

15. A method for signal processing a communications signals for a satellite comprising the steps of:
  receiving a signal from the satellite;
  reducing the bandwidth of the received signal;
  forming a first beam signal in a first direction;
  reducing a field of view of potential directions of the first beam signal;
  after the step of forming a first beam signal, filtering the first beam signal in a filter to determine more accurately the center frequency of an intended signal;
  tuning the filter to reduce the frequency dynamic range in response to the first beam signal; and
  forming spot beams in a second direction orthogonal to the first direction further reducing the uncertainty of the angle of the intended signal.

16. A method as recited in clam 15 further comprising the step of correcting the first beam signal both in frequency and direction offset for a time offset.

17. A method as recited in claim 15 further comprising the steps of determining errors in the signal, and correcting the errors in angle, frequency and timing domains.

18. A method as recited in claim 17 wherein the step of determining errors comprises the step of estimating a phase error.

19. A method as recited in claim 15 wherein the step of determining errors comprises the step of estimating an orthogonal direction error.

20. A method as recited in claim 15 wherein the step of determining errors comprises the step of detecting an offset error in the first direction.

21. A method as recited in claim 15 further comprising the steps of formatting the signal.

22. A method as recited in claim 15 further comprising the step of directing the signal to a user terminal.

23. A method as recited in claim 15 wherein the step of tuning comprises the step of reducing the frequency bandwidth.

24. A method as recited in claim 15 wherein the step of forming a first beam signal comprises using a fast Fourier transform.

25. A transmit digital signal processing circuit comprising:
  a transmit array digital processing circuit having:
    a format buffer for formatting a formatted signal to be transmitted;
    an encoder and interleave circuit for encoding the formatted signal for transmission;
    a modulator for modulating the formatted signal after encoding and providing a modulated signal, and
    a two dimensional digital beam forming circuit coupled to said modulator for forming a digital beam signal;
  a subarray base band/RF processing circuit having:
    a digital-to-analog converter coupled to said two dimensional digital beam forming circuit for converting the digital beam signal to a transmit signal;
    a plurality of transmit elements each coupled to said digital-to-analog converter for transmitting the transmit signal.

26. The transmit digital signal processing circuit of claim 25 further comprising:
  a plurality of local oscillator/mixers coupled to said digital-to-analog converter;
  a plurality of band pass filters each coupled to respective ones of said plurality of local oscillator/mixers, and
  a plurality of amplifiers each coupled to respective ones of said plurality of band pass filters and respective ones of said plurality of transmit elements.

27. The transmit digital signal processing circuit of claim 26, wherein said encoder/interleave circuit is coupled to each of said plurality of transmit elements.

28. The transmit digital signal processing circuit of claim 26, wherein each of said plurality of transmit elements has a cosine lookup table and a sine lookup table.

29. The transmit digital signal processing circuit of claim 26, wherein at least one of said plurality of transmit elements further comprises a latch.

30. A method of processing a received RF signal comprising:
  estimating an approximate channel frequency of the received RF signal;
  reducing the bandwidth of the received RF signal;
  forming a fan beam signal in a first direction in a first one-dimensional digital beam forming circuit; and
  forming spot beams in a second direction from the fan beam signal in a second one-dimensional digital beam forming circuit.

31. The method of claim 30, wherein the second direction is orthogonal to the first direction.

32. The method of claim 31, further comprising:
  reducing the fan beam signal bandwidth in a presummer prior to forming the spot beams.

33. The method of claim 32, further comprising:
  correcting a frequency offset of the fan beam signal prior to forming the spot beams.

34. The method of claim 33, further comprising:
  correcting timing changes in the fan beam signal prior to forming the spot beams.

35. The method of claim 34, further comprising:
  performing a finite impulse response and decimation filtering on the fan beam signal prior to forming the spot beams.

36. The method of claim 35, wherein the step of forming spot beams comprises combining coherently by phase adjustment and summation in the second direction.

37. The method of claim 36, further comprising correcting errors.

38. The method of claim 37, wherein the errors comprise one or more of timing, phase, frequency and tracking errors.

39. The method of claim 38, further comprising detecting transmission symbols.

40. The method of claim 39 further comprising demodulating the spot beams in a deinterleaving and decoding circuit to recover data.

* * * * *